United States Patent
Kanbe et al.

(12)
(10) Patent No.: US 6,271,663 B1
(45) Date of Patent: Aug. 7, 2001

(54) ROTATION DETECTOR OPERABLE TO MEASURE MAGNETISM DIRECTION CHANGE

(75) Inventors: Masakata Kanbe; Hitoshi Iwata; Katsuhiro Minami; Katsuya Kogiso; Takashi Suzuki; Masahiro Taniguchi, all of Aichi-ken (JP)

(73) Assignee: Kabushki Kaisha Tokai Rika Denki Seisakusho (JP)

( * ) Notice: Subject to any disclaimer, the term of this patent is extended or adjusted under 35 U.S.C. 154(b) by 0 days.

(21) Appl. No.: 09/300,628

(22) Filed: Apr. 27, 1999

(30) Foreign Application Priority Data

May 15, 1998 (JP) .................................................. 10-133718
Dec. 9, 1998 (JP) .................................................. 10-349862

(51) Int. Cl.[7] ................ G01B 7/30; G01D 5/14
(52) U.S. Cl. .................... 324/207.21; 324/207.22; 324/207.25
(58) Field of Search ..................................... 324/163–166, 324/173, 174, 207.13, 207.2, 207.21, 207.22, 207.25; 123/146.5 A, 406.52, 406.58, 617; 341/15

(56) References Cited

U.S. PATENT DOCUMENTS

| 4,235,213 | * | 11/1980 | Jellissen ......................... 123/146.5 A |
| 4,406,272 | * | 9/1983 | Kiess et al. .................. 324/207.25 X |
| 5,028,868 | * | 7/1991 | Murata et al. ..................... 324/207.2 |
| 5,291,133 | * | 3/1994 | Gokhale et al. ............ 324/207.21 X |
| 5,627,464 | * | 5/1997 | Shinjo et al. ..................... 324/207.2 |
| 6,064,198 | * | 5/2000 | Wolf et al. .................. 324/207.25 X |

FOREIGN PATENT DOCUMENTS

| 4241106 | 6/1993 | (DE) . |
| 19629611 | 1/1998 | (DE) . |
| 164832 | 12/1985 | (EP) . |
| 702203 | 7/1995 | (EP) . |

* cited by examiner

*Primary Examiner*—Gerard R. Strecker
(74) *Attorney, Agent, or Firm*—Stetina Brunda Garred & Brucker

(57) ABSTRACT

A rotation detector that detects rotational position with high precision. The rotation detector includes a rotor having a shaft. Projections are located at predetermined intervals on the periphery of the rotor and extend in an axial direction. The rotation detector further includes magnets and magnetism detecting elements respectively detecting magnetism of the magnets. At least one of the magnets and the detecting elements are arranged between the projections and the shaft at predetermined intervals.

14 Claims, 9 Drawing Sheets

ROTATION DETECTOR OPERABLE TO MEASURE MAGNETISM DIRECTION CHANGE

BACKGROUND OF THE INVENTION

The present invention relates to a rotation detector, and more specifically, to a rotation detector including a rotor having magnets.

FIG. 1 illustrates how an absolute position detection type detector detects rotational position. The rotation detector includes a rotor 30, which is fixed on a rotating shaft and integrally rotates with the shaft. An N pole zone 32 and an S pole zone 33 are alternately formed at sixty degree intervals on the rotor 30 in a circumferential direction. In positions facing the rotor 30, first to third magnetic resistance elements 31 are arranged around the axis O of the rotor 30 at forty-degree intervals. Each of the first to third resistance elements 31 detects the N pole zone 32 and the S pole zone 33, which alternately pass by the resistance elements 31 at sixty-degree intervals during the rotation of the rotor 30.

When the N pole zone 32 is detected, the first to third resistance elements 31 respectively output signals SG1, SG2, SG3 having an H level. When the S pole zone 33 is detected, the resistance elements 31 respectively output the signals SG1, SG2, SG3 having an L level. When the zone detected by each resistance element 31 moves from the N pole zone 32 to the S pole zone 33, each of the signals SG1, SG2, SG3 changes from the H level to the L level. Contrarily, when the zone detected by each resistance element 31 moves from the S pole zone 33 to the N pole zone 32, each of the signals SG1, SG2, SG3 changes from the L level to the H level. As shown in FIG. 1, the signals SG1, SG2, SG3 of the resistance elements 31 change gradually between the L and H levels. The reason for this is because a direction of magnetic flux changes gradually when the detected zone moves from the N pole zone 32 to the S pole zone 33. Three comparators (not shown) respectively receive the signals SG1–SG3 and adjust the waveforms of the signals SG1–SG3, thus generating detection signals S1–S3, which change sharply between the L and H levels.

More specifically, each of the comparators compares an output signal with a reference value, which is a middle level between the H level and the L level, and generates an H level detection signal S1–S3 when the output signal is greater than the reference value or generates an L level detection signal S1–S3 when the output signal is lower than the reference value. The reference value is the level of the signals SG1–SG3 output when the border between the N pole zone 32 and the S pole zone 33 passes by each of the first to third resistance elements 31. When any one of the detection signals S1–S3 changes from the L level to the H level or from the H level to the L level, the rotational position of the rotor 30 (or rotation shaft) is determined based on the state of the other detection signals. In the case of FIG. 1, the rotational position (absolute position) is detected in the range of zero to 120 degrees at intervals of twenty degrees.

However, it is difficult to precisely form the N pole zone 32 and the S pole zone 33 alternately at sixty-degree intervals on the rotor 30 in the circumferential direction. Accordingly, the rotational position is not detected at twenty-degree intervals with precision at the point when the detection signals S1–S3 change from the L level to the H level or from the H level to the L level.

Furthermore, in the above rotation detector, the levels of the output signals SG1–SG3 may be varied by objects located near the resistance element 31 that can affect magnetic flux. A shielding member may be provided to shield the rotation detector. However, this increases the number of parts, cost and assembly work.

The objective of the present invention is to provide a rotation detector that detects rotational position with high precision.

SUMMARY OF THE INVENTION

To achieve the above objective, the present invention provides a rotation detector. The rotation detector includes a rotor having a shaft. Projections are located at predetermined intervals on the periphery of the rotor and extend in an axial direction. The rotation detector further includes magnets and magnetism detecting elements respectively detecting magnetism of the magnets. At least one of the magnets and the detecting elements are arranged between the projections and the shaft at predetermined intervals.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
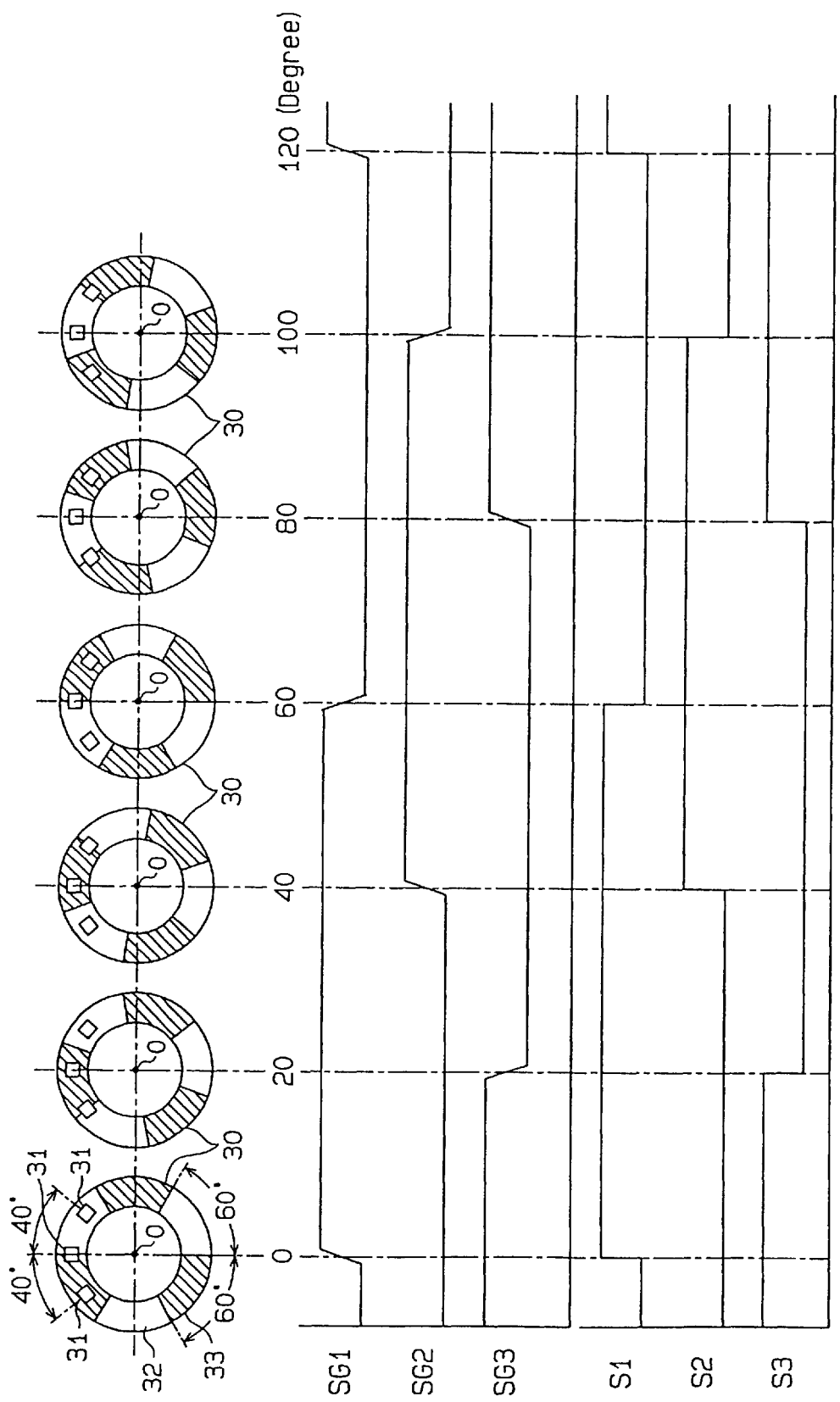
FIG. 1 is a waveform diagram illustrating the operation of a prior art rotation detector.

In the drawings, like numerals are used for like elements throughout.

First Embodiment

Figure 2:
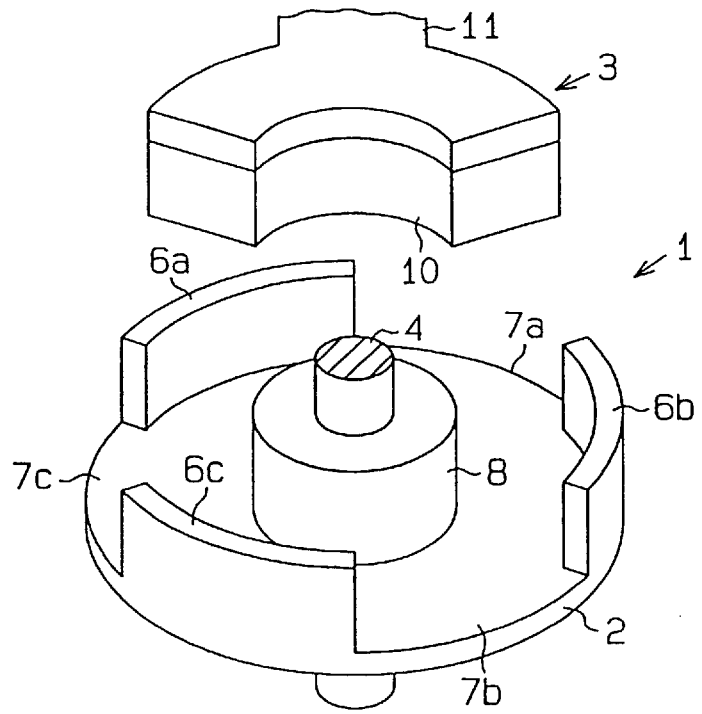
FIG. 2 is a partial exploded perspective view of a rotation detector according to a first embodiment of the present invention.

FIG. 2 is a partial exploded perspective view of a rotation detector 1 according to a first embodiment of the present invention. The rotation detector 1 includes a rotor 2, which is preferably made of a metal plate, and a magnetism-detecting member 3. The rotor 2 rotates integrally with a steering shaft 4 about its axis O (FIG. 3).

Figure 3:
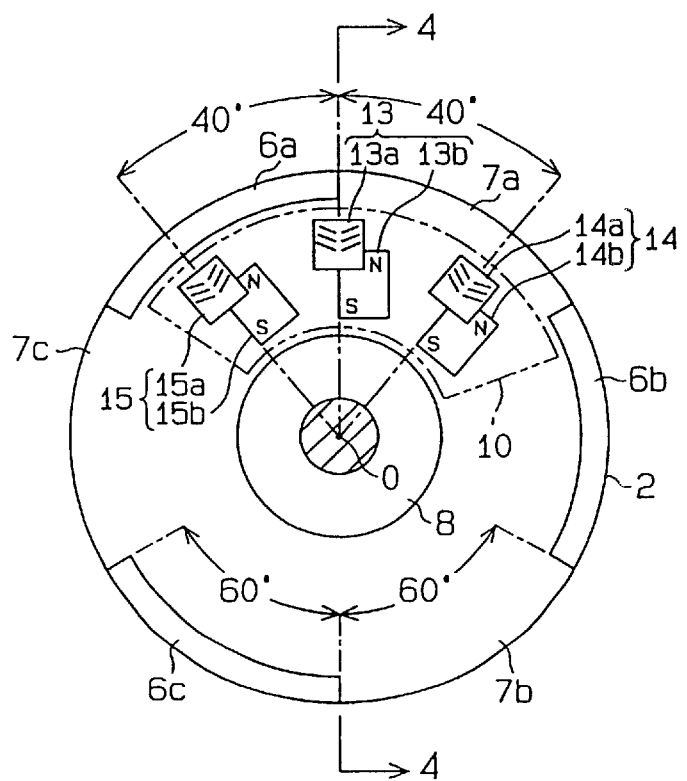
FIG. 3 is a plan view of the rotation detector of FIG. 2.

As shown in FIGS. 2 and 3, the rotor 2 preferably includes three arcuate magnetic path changer projections 6a, 6b, 6c, which extend perpendicular from its peripheral surface and are spaced at predetermined intervals. The angle from one end to the other end of each changer projection 6a, 6b, 6c with reference to the axis O is preferably 60 degrees. Accordingly, the space between each changer projection 6a, 6b, 6c with reference to the axis O is also sixty degrees. Accordingly, the changer projections 6a, 6b, 6c and flat zones 7a, 7b, 7c, on which no changer projections are formed, exist alternately on the periphery of the rotor 2. Further, a column 8 for forming a magnetic path is located or formed on the rotor 2. The column 8 extends from the center of the rotor 2 in the same direction as the changer projections 6a–6c.

Figure 4:
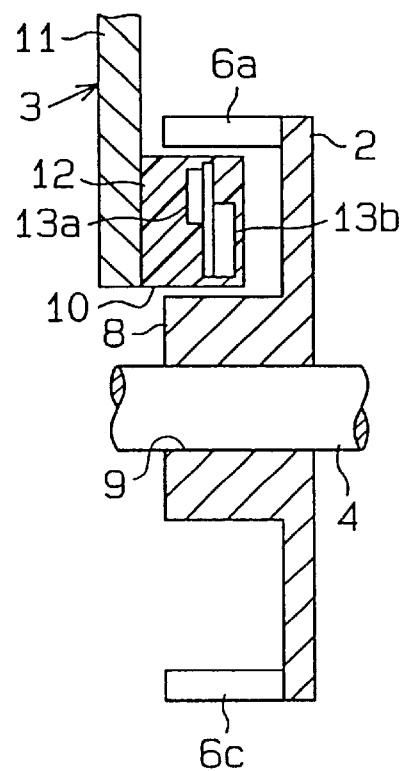
FIG. 4 is a partial cross sectional view of the rotation detector of FIG. 2 taken along line 4—4 of FIG. 3.

FIG. 4 is a cross sectional view taken along line 4—4 of FIG. 3. The cross sections of the changer projections 6a, 6b, 6c, the rotor 2 and the column 8 form a U-shape. The column 8 includes a through hole 9 in which the steering shaft 4 is received and secured.

The detecting member 3 includes a support arm 11 and a detecting body 10 attached to the distal end of the support arm 11. The proximal end of the support arm 11 is secured to a fixing member (not shown). The detecting body 10 is accommodated in the U-shaped space formed by the changer projections 6a, 6b, 6c, the rotor 2 and the column 8. The detecting body 10 includes first to third magnetism detectors 13, 14, 15, which are preferably enclosed in a resin molding material 12 (See FIG. 3).

The first magnetism detector 13 includes a first magnetic resistance element 13a and a first bias magnet 13b, which is arranged near the resistance element 13a. The first bias magnet 13b includes an S pole and an N pole and is arranged such that the S pole faces the axis O and the N pole faces the direction opposite to the axis O. Further, the first bias magnet 13b is offset from the first resistance element 13a and from a plane crossing the axis O, as shown in FIG. 3.

Figure 5:
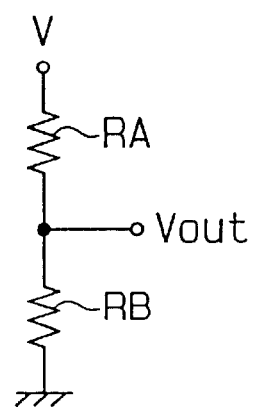
FIG. 5 shows an equivalent circuit of a resistance element of the rotation detector of FIG. 2.

The first resistance element 13a is a magnetism detection element, which generates a detection voltage Vout that varies in accordance with a direction of magnetic flux of the first bias magnet 13b. As shown in FIG. 5, the first resistance element 13a includes resistors RA, RB, the resistance values of which vary respectively in accordance with the direction of two magnetic fluxes. In the first embodiment, the first resistance element 13a is arranged such that a lowest detection voltage Vout (L level) is generated when the magnetic flux of the first bias magnet 13b flows in the radial direction from the axis O, and a highest detection voltage Vout (H level) is generated when the magnetic flux flows in a substantially forty five degrees direction with respect to the radial direction.

The second magnetism detector 14 includes a second resistance element 14a and a second bias magnet 14b, which is arranged near the second resistance element 14a. The arrangement between the second resistance element 14a and the second bias magnet 14b is the same as that between the first resistance element 13a and the first bias magnet 13b. The second resistance element 14a and the second bias magnet 14b are respectively spaced forty degrees in the clockwise direction with reference to the axis O from the first resistance element 13a and the first bias magnet 13b.

The second resistance element 14a is a magnetism detection element for generating the detection voltage Vout that varies in accordance with the direction of magnetic flux of the second bias magnet 14b. The second resistance element 14a includes the resistors RA, RB, which have resistance values that vary respectively in accordance with the directions of two magnetic fluxes. The second resistance element 14a is arranged such that a lowest detection voltage Vout (L level) is generated when the magnetic flux of the second bias magnet 14b flows in the radial direction from the axis O, and such that a highest detection voltage Vout (H level) is generated when the magnetic flux flows in a substantially forty five degrees direction with respect to the radial direction.

The third magnetism detector 15 includes a third resistance element 15a and a third bias magnet 15b, which is arranged near the third resistance element 15a. The arrangement between the third resistance element 15a and the third bias magnet 15b is the same as that between the first resistance element 13a and the first bias magnet 13b. The third resistance element 15a and the third bias magnet 15b are respectively spaced forty degrees in the counterclockwise direction with reference to the axis O from the first resistance element 13a and the first bias magnet 13b.

The third resistance element 15a is a magnetism detection element for generating the detection voltage Vout that varies in accordance with the direction of magnetic flux of the third bias magnet 15b. The third resistance element 15a includes the resistors RA, RB, which have resistance values that vary respectively in accordance with the directions of two magnetic fluxes. The third resistance element 15a is arranged such that a lowest detection voltage Vout (L level) is generated when the magnetic flux of the third bias magnet 15b flows in the radial direction from the axis O, and such that a highest detection voltage Vout (H level) is generated when the magnetic flux flows in a substantially forty five degrees direction with respect to the radial direction.

In FIG. 3, when the changer projection 6a exists on a radial line passing through the N pole of the third bias magnet 15b from the axis O, the magnetic flux of the third bias magnet 15b flows in a radial direction. This is because a U-shaped magnetic path is formed by the changer projection 6a, the rotor 2 and the column 8. The magnetic flux of the third bias magnet 15b is also attracted to the changer projection 6a from the N pole. As a result, the magnetic flux of the bias magnet 15b flows toward the changer 6a, that is, in the radial direction. In other words, the changer projection 6a serves as one section for forming a magnetic path. In this case, the third resistance element 15a generates the detection voltage Vout having the L level.

As another example, when the changer projection 6a is not on the radial line passing through the N pole of the second bias magnet 14b from the axis O, the magnetic flux of the second bias magnet 14b flows in a direction substantially forty-five degrees with respect to the radial direction. This is because the magnetic flux is not attracted by any changer projection. As a result, the magnetic flux flows in a direction substantially forty-five degrees with respect to the radial direction. In this case, the second resistance element 14a generates the detection voltage Vout having the H level.

Further, when the position of the first bias magnet 13b changes from the flat zone 7a to a first end (right end in FIG. 3) of the changer projection 6a (the position changes with respect to the rotor 2 as the rotor 2 rotates), the magnetic flux of the first bias magnet 13b changes its direction from about forty-five degrees direction with respect to the radial direction to the radial direction (0 degrees). In this case, the first resistance element 13a generates the detection voltage Vout that changes from the H level to the L level. Further, when the position of the first bias magnet 13b changes from a second end (left end in FIG. 3) of the changer 6a to the flat zone 7c, the magnetic flux of the first bias magnet 13b changes its direction from the radial direction to about forty-five degrees direction with respect to the radial direction. In this case, the first resistance element 13a generates the detection voltage Vout that changes from the L level to the H level.

The three comparators (not shown), which are of a type widely known, respectively receive the detection voltages Vout of the first to third resistance elements 13a–15a and compare them with a predetermined reference voltage. Then, an H level detection signal is generated when the detection voltage Vout is greater than the reference voltage, and an L level detection signal is generated when the detection voltage Vout is lower than the reference voltage. The predetermined reference voltage is the detection voltage Vout generated by the resistance element when the magnetism detector 13 is positioned on the border between the changer projection and the flat zone.

The rotation detector 1 of the first embodiment has the following characteristics and advantages.

(1) The detecting body 10 is accommodated in the space between the changer projections 6a–6c and the column 8. Accordingly, the changer projections 6a–6c prevent the magnetic fluxes of the first to third bias magnets 13b–15b from being affected by external noise. Further, the first to third resistance elements 13a–15a precisely detect the changer projections 6a–6c, which rotate with the rotor 2.

(2) The changer projections 6a–6c are formed or located on the periphery of the rotor 2 at equal angular intervals. Accordingly, unlike the prior art, in which formation of N pole and S pole zones requires high precision and high technology, the dimensions of the changer projections 6a–6c are easily and accurately adjusted by grinding. As a result, the rotor 2 including the changer projections 6a–6c may be manufactured at a low cost.

(3) The changer projections 6a–6c are preferably integrally formed with the rotor 2, making the number of parts and the amount of assembly work low.

(4) Since the detecting body 10 is accommodated in the space between the changer projections 6a–6c and the column 8, the size of rotation detector is compact.

Second Embodiment

Figure 6:
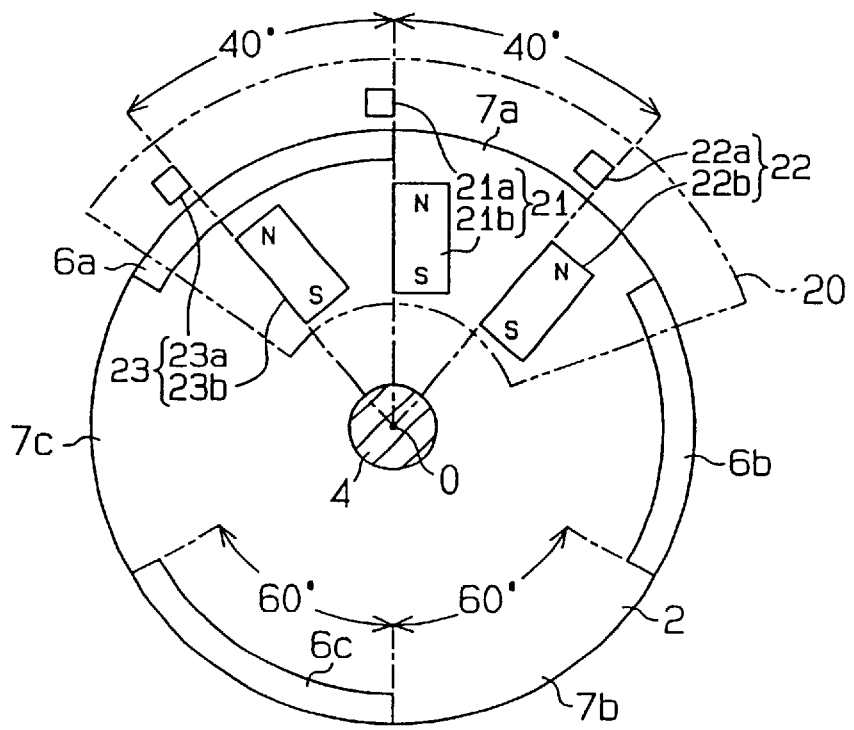
FIG. 6 is a plan view of a rotation detector according to a second embodiment of the present invention.
Figure 7:
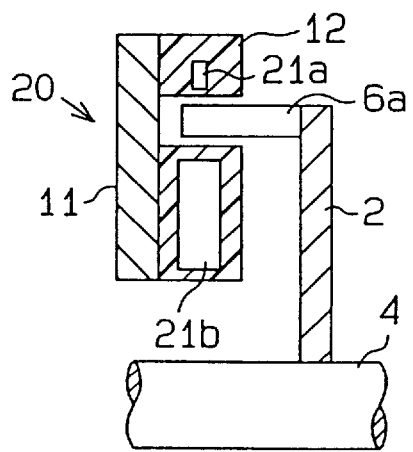
FIG. 7 is a partial cross sectional view of the rotation detector of FIG. 6.

As shown in FIGS. 6 and 7, a magnetism-detecting member 20 of a rotation detector according to a second embodiment of the present invention is located at the distal end of a support arm 11. The magnetism-detecting member 20 includes three magnetism detectors 21, 22, 23, which are enclosed in resin molding material 12. The first to third detectors 21–23 respectively include first to third magnetic resistance elements 21a–23a and first to third bias magnets 21b–23b. In the second embodiment, the changer projections 6a–6c pass between the first to third resistance element 21a–23a and the first to third bias magnets 21b–23b. In other words, the first to third resistance elements 21a–23a are arranged on one side (i.e., outside) the changer projections 6a–6c, and the first to third bias magnets 21b–23b are arranged on the other side (i.e., inside) the changer projections 6a–6c. Each S pole of the bias magnets 21b–23b faces the axis O and each N pole faces in a direction opposite to the axis O. The arrangement of the poles may be reversed, that is, each N pole of the bias magnets 21b–23b may face the axis O, and each S pole may face in a direction opposite to the axis O.

Figure 8A:
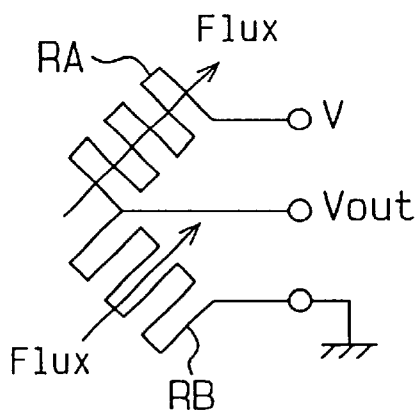
FIG. 8(a) shows a state in which a magnetic flux flows in a resistance element of the rotation detector of FIG. 6.
Figure 8B:
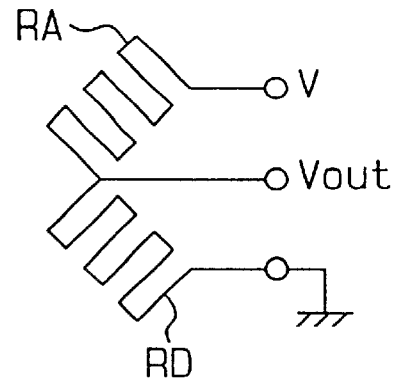
FIG. 8(b) shows a state in which a magnetic flux does not flow in the resistance element of the rotation detector of FIG. 6.
Figure 9:
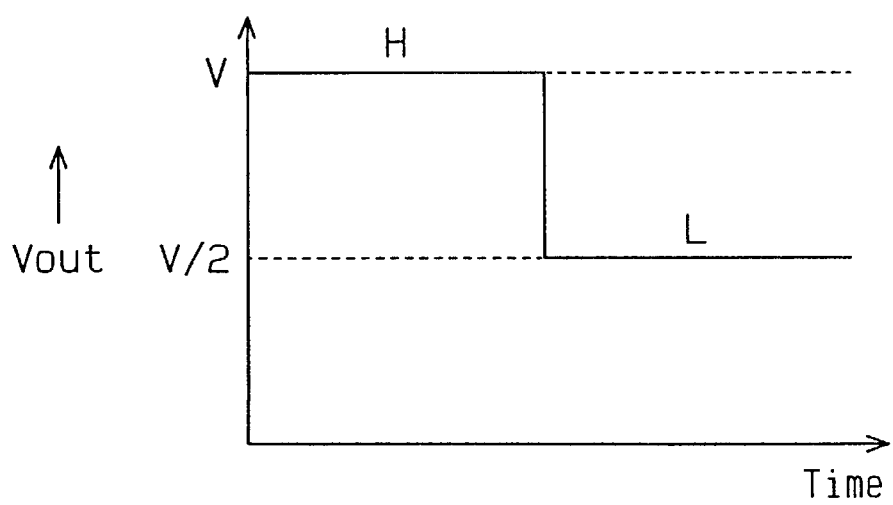
FIG. 9 shows the output waveform of the resistance element of FIGS. 8(a), 8(b)

As shown in FIG. 6, the first bias magnet 21b is offset with respect to the first resistance element 21a. The first resistance element 21a faces the magnetic flux of the first bias magnet 21b when any of the changer projections 6a–6c is not interposed between it and the first bias magnet 21b. The magnetic flux of the bias magnet 21b flows in a direction of about forty-five degrees with respect to the radial direction. More specifically, as shown in FIG. 8(a), when the magnetic flux of the first bias magnet 21b passes through the resistors RA, RB in a direction of about forty-five degrees with respect to the radial direction, the first resistance element 21a generates the highest detection voltage Vout (H level) as shown in FIG. 9. As shown in FIG. 8(b), when the magnetic flux does not pass through the resistors RA, RB, the first resistance element 21a generates the lowest detection voltage Vout (L level (V/2)), also shown in FIG. 9.

In FIG. 6, the second resistance element 22a and the second bias magnet 22b are respectively spaced from the first resistance element 21a and the first bias magnet 21b by about forty degrees in the clockwise direction with reference to the axis O. As shown in FIGS. 8(a) and 8(b), the second resistance element 22a also generates the highest detection voltage Vout or the lowest detection voltage Vout as shown in FIG. 9, based on whether the magnetic flux of the second bias magnet 22b passes through the resistors RA, RB.

In FIG. 6, the third resistance element 23a and the third bias magnet 23b are respectively spaced from the first resistance element 21a and the first bias magnet 21b by about forty degrees in the counterclockwise direction with reference to the axis O. As shown in FIGS. 8(a) and 8(b), the third resistance element 23a also generates the highest detection voltage Vout or the lowest detection voltage Vout as shown in FIG. 9, based on whether the magnetic flux of the third bias magnet 23b passes through the resistors RA, RB.

When the changer projection 6a is located between the third bias magnet 23b and the third resistance element 23a, the magnetic flux of the third bias magnet 23b is shielded by the changer projection 6a and does not reach the third resistance element 23a. That is, the changer projections 6a–6c block the magnetic path. In this case, the third resistance element 23a generates the detection voltage Vout having the L level.

When any changer projection 6a–6c is not interposed between the second bias magnet 22b and the second resistance element 22a, the magnetic flux of the second bias magnet 22b passes through the resistance element 22a in a direction of about forty-five degrees with respect to the radial direction. In this case, the second resistance element 22a generates the detection voltage Vout having the H level.

Further, when the position of the first bias magnet 21b changes from the flat zone to a first end (right end in FIG. 6) of the changer projection 6a, the magnetic flux passing through the first resistance element is lost. In this case, the first resistance element 21a generates the detection voltage Vout that changes from the H level to the L level. Then, when the position of the first bias magnet 21b changes from a second end (left end in FIG. 6) of the changer projection 6a to another flat zone, the magnetic flux passes through the first resistance element 21a in a direction of forty-five degrees from the radial direction. In this case, the first resistance element 21a generates the detection voltage Vout that changes from the L level to the H level.

The rotation detector of the second embodiment has the following characteristics and advantages.

(1) Since the first to third bias magnets 21b–23b are arranged inside the changer projections 6a–6c, the changer projections 6a–6c prevent the magnetic fluxes of the first to third bias magnets 21b–23b from being affected by external noises. Furthermore, the first to third resistance elements 21a–23a accurately detect the changer projections 6a–6c.

(2) The changer projections 6a–6c are more easily and precisely formed than the prior art N pole and S pole zones. This reduces manufacturing costs and improves precision of detection.

(3) The changer projections 6a–6c are preferably integrally formed with the rotor 2, which decreases the number of parts and the amount of assembly work.

(4) Since the first to third bias magnets 21a–23a are arranged inside the changer projections 6a–6c, the rotation detector is compact.

Third Embodiment

Figure 10:
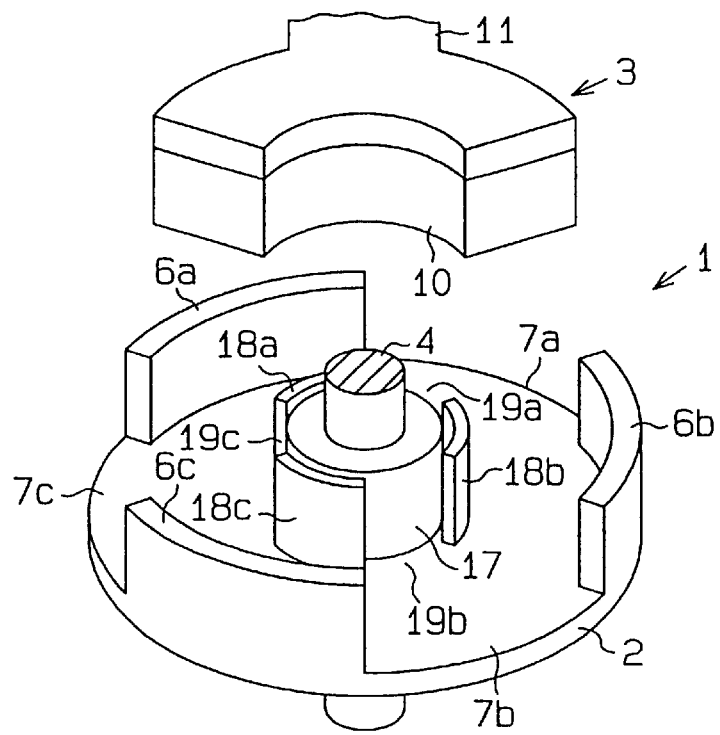
FIG. 10 is a partial exploded perspective view of a rotation detector according to a third embodiment of the present invention.
Figure 11:
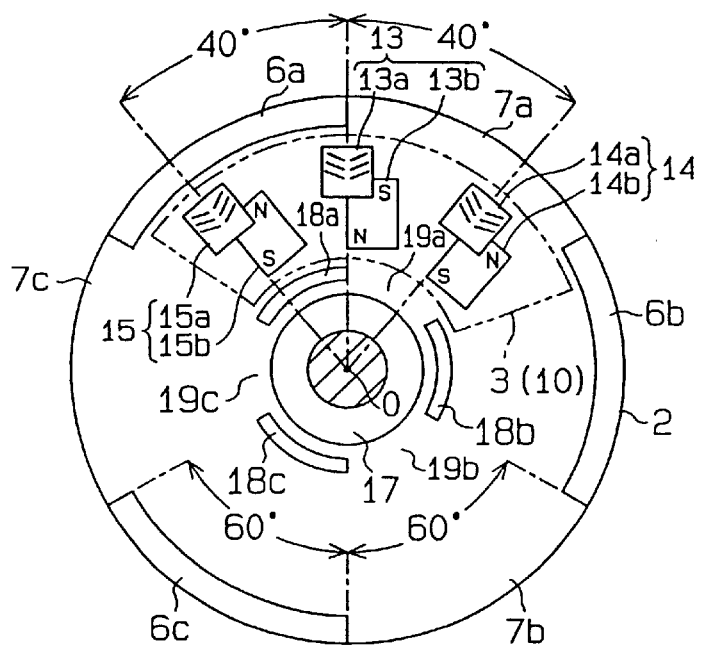
FIG. 11 is a plan view of the rotation detector of FIG. 10.
Figure 12:
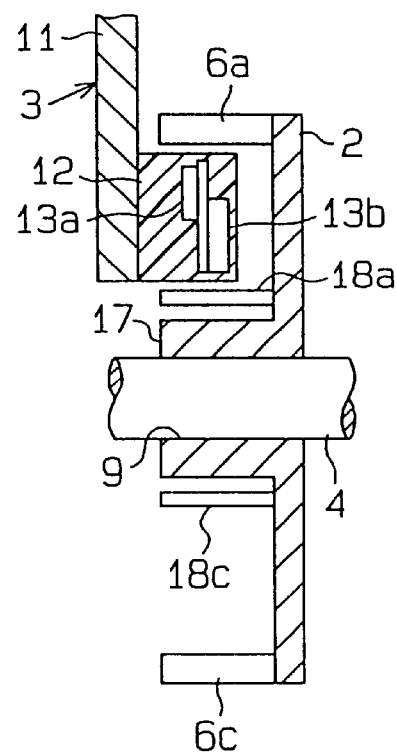
FIG. 12 is a partial cross sectional view of the rotation detector of FIG. 10.

As shown in FIGS. 10, 11, and 12 a rotor 2 of a rotation detector according to a third embodiment includes a boss 17 which is preferably integrally formed with the shaft 4, and three arcuate second changer projections 18a, 18b, 18c. The second changer projections 18a, 18b, 18c are spaced around the boss 17 and from the boss 17 by a predetermined distance and extend from the rotor 2 at equal intervals. The second changer projections 18a, 18b, 18c are formed at sixty degree angular intervals with reference to the axis O. Accordingly, the second changer projections 18a, 18b, 18c and flat zones, in which the second changer projections are not formed, are alternately arranged around the boss 17.

For example, when the changer projection 6a and the second changer projection 18a are on a radial line from the third bias magnet 15b, the magnetic flux of the third bias magnet 15b is directed in the radial direction. This is because the changer projection 6a, the rotor 2, and the second changer projection 18a form a U-shaped magnetic path, and the magnetic flux of the first bias magnet 13b is attracted by the changer projection 6a and the second changer projection 18a. As a result, the magnetic flux of the third bias magnet 15b is directed toward the changer projection 6a and the second changer projection 18a. In this case, the third resistance element 15a generates the detection voltage Vout having the L level.

When the changer projection 6a–6c and the second changer projection 18a–18c are not on a radial line from the second bias magnet 14b, the magnetic flux of the second bias magnet 14b is directed in a direction of about forty-five degrees with respect to the radial direction. This is because the magnetic flux is not attracted to the changer projection 6a–6c and the second changer projection 18a–18c. As a result, the flux is directed in a direction of forty-five degrees with respect to the radial direction. In this case, the second resistance element 14a generates the detection voltage Vout having the H level.

Further, when the position of the first bias magnet 13b changes from the flat zone to first ends (right ends in FIG. 11) of the changer projection 6a and the second changer projection 18a, the magnetic flux of the first bias magnet 13b turns to the radial direction. In this case, the first resistance element 13a generates the detection voltage Vout that changes from the H level to the L level. Subsequently, when the position of the first bias magnet 13b changes from second ends (right ends in FIG. 11) of the changer projection 6a and the second changer projection 18a to a flat zone, the magnetic flux of the first bias magnet 13b is directed in a direction forty-five degrees from the radial direction. In this case, the first resistance element 13a generates the detection voltage vout that changes from the L level to the H level.

The rotation detector of the third embodiment has the following characteristics and advantages.

(1) The detecting body 10 is accommodated in a space formed by the changer projections 6a–6c and the second changer projections 18a–18c. Accordingly, the changer projections 6a–6c and the second changer projections 18a–18c prevent the magnetic fluxes of the first to third bias magnets 13b–15b from being affected by external noises. Further, the first to third resistance elements 13a–15a accurately detect the changer projections 6a–6c and the second changer projections 18a–18c.

(2) The changer projections 6a–6c and the second changer projections 18a–18c are formed more easily and precisely than the prior art N pole and S pole. Therefore, the rotor 2 including the changer projections 6a–6c and the second changer projections 18a–18c is inexpensively manufactured.

(3) The changer projections 6a–6c and the second changer projections 18a–18c are preferably integrally formed with the rotor 2, such that the number of parts and the amount of the assembly work are not increased.

(4) Since the detecting body 10 is accommodated in a space between the changer projections 6a–6c and the second changer projections 18a–18c, the rotation detector is compact.

Figure 13:
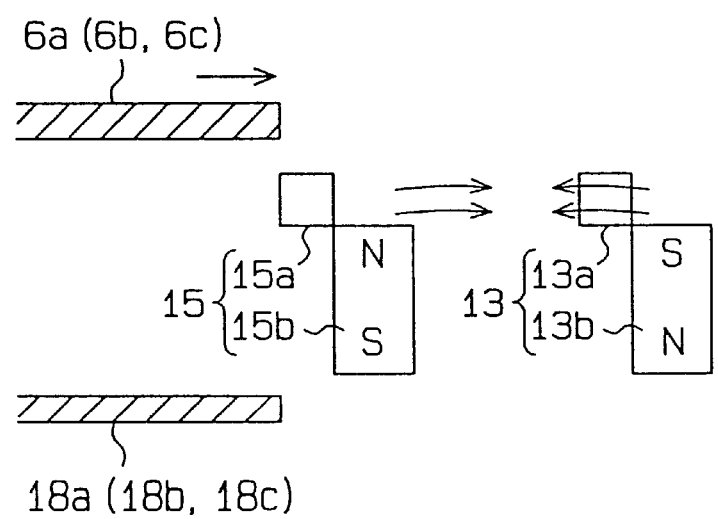
FIG. 13 is a first diagram illustrating the operation of the rotation detector of FIG. 10.
Figure 14:
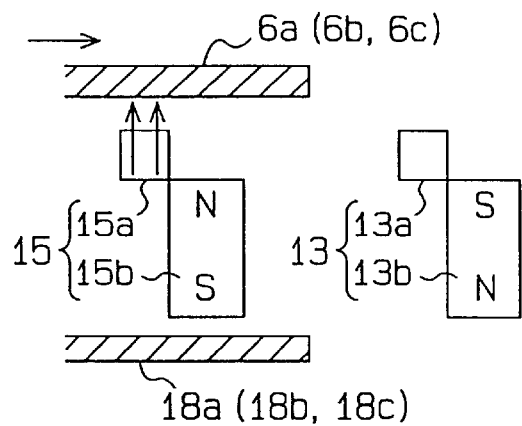
FIG. 14 is a second diagram illustrating the operation of the rotation detector of FIG. 10.

(5) In the third embodiment, the magnetic polarities of each bias magnet 13b–15b are preferably opposite to one another, which allows the magnetic fluxes of the adjacent bias magnets not to repel one another. That is, as shown in FIG. 13, since the magnetic fluxes of the adjacent magnets are attracted to one another, the magnetic fluxes are less disturbed. Therefore, when the position of the first and second changer projections 6a and 18a change as shown in FIGS. 13 and 14, the vector of magnetic flux, which shows the direction of magnetic flux, changes greatly (by about ninety degrees). As a result, the detection outputs of the resistance elements 13a–15a increase. This improves precision for detecting angular change of the rotor 2.

Figure 15:
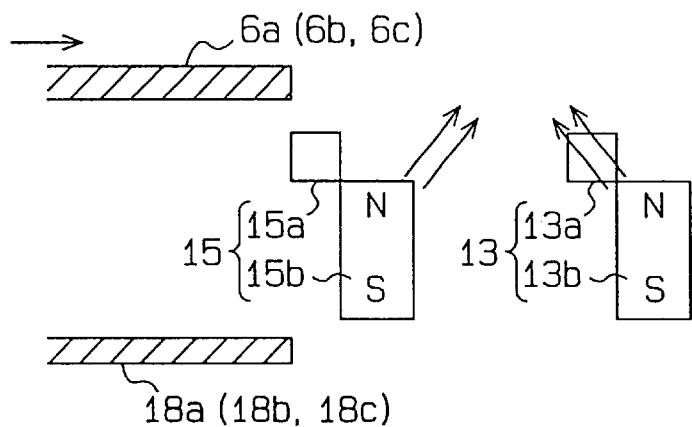
FIG. 15 is a first diagram illustrating an operation compared with the operation of the rotation detector of FIG. 10.
Figure 16:
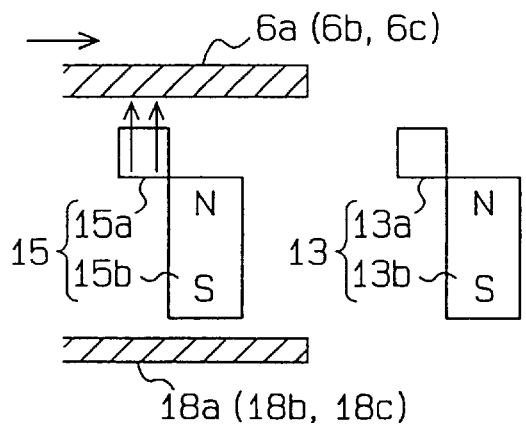
FIG. 16 is a second diagram illustrating an operation compared with the operation of the rotation detector of FIG. 10.

FIGS. 15 and 16 show an example in which the bias magnets 13b–15b are arranged such that their polarities are the same as the adjacent magnets. In this case, the magnetic fluxes of the adjacent bias magnets 13b–15b repel one another, thus disturbing each magnetic flux. Therefore, the change of vector of magnetic flux, which is caused by the change of positions of the changer projections 6a and 18a, is smaller.

(6) The second changer projections 18a–18c enhance the formation of the magnetic path and improve the detection sensitivity of the detectors 13–15.

It should be apparent to those skilled in the art that the present invention may be embodied in many other specific forms without departing from the spirit or scope of the invention. Particularly, it should be understood that the invention might be embodied in the following forms.

The width between the first and second ends of the changer projections 6a–6c may be thirty degrees with reference to the axis O, and the detectors 13–15 may be formed at 20 degree intervals. This enables detection of smaller angles.

In the second embodiment, the first to third bias magnets 21b–23b may be arranged outside the changer projections 6a–6c, and the first to third resistance elements 21a–23a may be arranged inside the changer projections 6a–6c.

The rotor 2 may be formed by pressing metal plate. In this case, the intervals between the changer projections 6a–6c may be adjusted, such as by grinding after the press forming. In this way, the rotor 2 is formed within a shorter time period without requiring precision and high manufacturing skills, thus lowering manufacturing costs.

Also, the rotor 2 including the changer projections 6a–6c may be formed by sintering metal without requiring high precision. This also lowers manufacturing costs. Further, the changer projections 6a–6c and the rotor 2 may be formed separately and may be joined together, such as by welding.

Figure 17A:
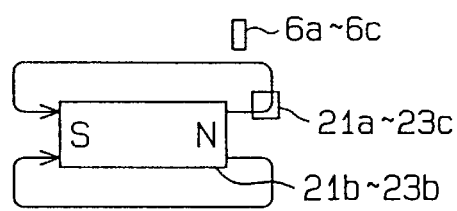
FIG. 17(a) and FIG. 17(b) are diagrams illustrating the operations of rotation detectors according to further embodiments of the present invention.
Figure 17B:
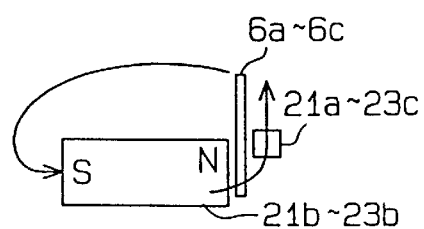

As shown in FIGS. 17(*a*) and 17(*b*), the changer projections may be formed to be thin. In this case, when the changer projections 6a–6c face the first to third bias magnets 21b–23b, the magnetic fluxes of the first to third bias magnets 21b–23b flow beyond the thin changer projections 6a–6c. The magnetic fluxes flow along the changer projections 6a–6c.

Figure 18A:
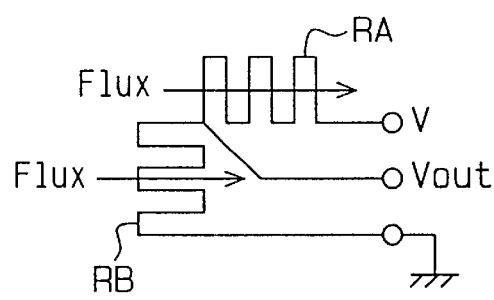
FIG. 18(a) and FIG. 18(b) are diagrams illustrating how magnetic flux flows in a resistance element of the rotation detectors of FIGS. 17(a), 17(b)
Figure 18B:
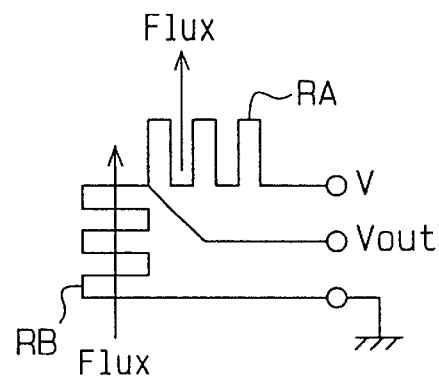
Figure 19:
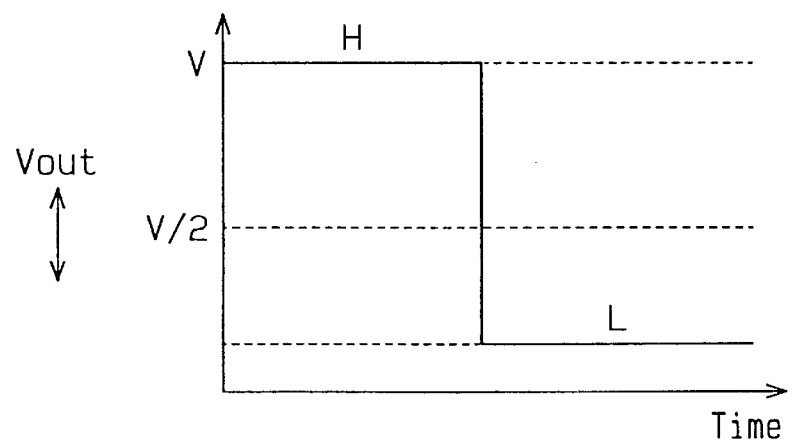
FIG. 19 shows an output voltage waveform of the resistance elements of FIGS. 18(a), 18(b).

As shown in FIG. 17(*a*), in the flat zones, the magnetic fluxes passing through the first to third resistance elements 21a–23a are directed in the radial direction. In this state, the first to third resistance elements 21a–23a generate the detection voltage Vout having the H level. Further, as shown in FIG. 17(*b*), when the bias magnet 21b–23b faces the changer projection 6a–6c, the magnetic flux passing through the resistance element is directed in a direction tangential to the rotor 2. In this state, the first to third resistance elements 21a–23a generate the detection voltage Vout having the L level. That is, in the case of FIG. 17(*a*), the magnetic flux passes through the resistors RA, RB of the resistance elements as shown in FIG. 18(*a*), and the highest detection voltage (V) is generated as shown in FIG. 19. In the case of FIG. 17(*b*), the magnetic flux passes through the resistors RA, RB of the resistance elements as shown in FIG. 18(*b*), and the lowest detection voltage Vout (0) is generated.

The first to third resistance elements 13a–15a and 21a–23a may be arranged such that when the detection voltage Vout is at the H level, the resistance value of the resistor RA is minimum and the resistance value of the resistor RB is maximum, and such that when the detection voltage Vout is at the L level, the resistance value of the resistor RA is maximum and the resistance value of the resistor RB is minimum. In this case, the amplitude between the H level and L level of the detection voltages Vout is maximum, and detection sensitivity of the detection voltage Vout is enhanced.

Therefore, the present examples and embodiments are to be considered as illustrative and not restrictive and the invention is not to be limited to the details given herein, but may be modified within the scope and equivalence of the appended claims.

What is claimed is:

1. A rotation detector comprising:
    a rotor including a shaft, wherein a plurality of projections are located at predetermined intervals on the periphery of the rotor and extend in an axial direction;
    a plurality of magnets; and
    a plurality of magnetic resistance elements that respectively detect the change of a direction of magnetism of the magnets in response to movement of the projections as the rotor rotates,
    wherein the magnets and the detecting elements are stationarily arranged with respect to the rotor between the projections and the shaft, or at opposite sides of the projections, at predetermined angular intervals around the shaft.

2. The rotation detector according to claim 1, wherein the magnets and the magnetic resistance elements are arranged between the projections and the shaft.

3. The rotation detector according to claim 2, wherein accompanying rotation of the rotor, the magnetic fluxes of the magnets flow in a radial direction when not facing the projections and flow in a forty-five degrees direction with respect to the radial direction when facing the projections.

4. The rotation detector according to claim 3, wherein the magnetic resistance elements generate a predetermined level of voltage in accordance with the direction of the magnetic fluxes of the magnets.

5. The rotation detector according to claim 4, wherein the projections comprise three projections arranged at sixty-degree intervals, and the magnets and the magnetic resistance elements comprise three magnets arranged at forty-degree intervals and three magnetic resistance elements arranged at forty-degree intervals.

6. The rotation detector according to claim 4, wherein the projections comprise three projections arranged at thirty-degree intervals, and the magnets and the magnetic resistance elements comprise three magnets arranged at twenty-degree intervals and three magnetic resistance elements arranged at twenty-degree intervals.

7. The rotation detector according to claim 2, wherein the rotor includes a columnar portion integrally formed with the shaft.

8. The rotation detector according to claim 7, wherein the rotor includes a plurality of second projections formed around the columnar portion at predetermined intervals and which extend axially along the shaft.

9. The rotation detector according to claim 1, wherein the magnets are arranged between the projections and the shaft, and the magnetic resistance elements are arranged opposite to the magnets with the projections in between.

10. The rotation detector according to claim 9, wherein accompanying rotation of the rotor, the magnetic fluxes of the magnets flow in a radial direction when not facing the projections and flow in a forty-five degrees direction with respect to the radial direction when facing the projections.

11. The rotation detector according to claim 10, wherein the magnetic resistance elements generate a predetermined level of voltage in accordance with the direction of the magnetic fluxes of the magnets.

12. The rotation detector according to claim 11, wherein the projections comprise three projections arranged at sixty-degree intervals, and the magnets and the magnetic resistance elements comprise three magnets arranged at forty-degree intervals and three magnetic resistance elements arranged at forty-degree intervals.

13. The rotation detector according to claim 11, wherein the projections comprise three projections arranged at thirty-degree intervals, and the magnets and the magnetic resistance elements comprise three magnets arranged at twenty-degree intervals and three magnetic resistance elements arranged at twenty-degree intervals.

14. The rotation detector according to claim 10, wherein the projections have a thickness formed to allow the magnetic fluxes of the magnets to flow to the magnetic resistance elements through the projections when the magnets face the projections.

\* \* \* \* \*

UNITED STATES PATENT AND TRADEMARK OFFICE
CERTIFICATE OF CORRECTION

PATENT NO. : 6,271,663 B1
DATED : August 7, 2001
INVENTOR(S) : Masakata Kanbe, Hitoshi Iwata, Katsuhiro Minami, Katsuya Kogiso, Takashi Suzuki and Masahiro Taniguchi It is certified that error appears in the above-identified patent and that said Letters Patent is hereby corrected as shown below:

<u>Title page,</u>
Item [73], Assignee: -- Kabushiki Kaisha Tokai Rika Denki Seisakusho --

Signed and Sealed this

Sixteenth Day of April, 2002

*Attest:*

JAMES E. ROGAN
*Director of the United States Patent and Trademark Office*

*Attesting Officer*